United States Patent
Li et al.

(10) Patent No.: US 12,428,312 B2
(45) Date of Patent: Sep. 30, 2025

(54) PREPARATION METHOD OF NI-RICH TERNARY PRECURSOR AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Weiquan Li, Guangdong (CN); Changdong Li, Guangdong (CN); Genghao Liu, Guangdong (CN); Dingshan Ruan, Guangdong (CN); Hongjia Lin, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 85 days.

(21) Appl. No.: 18/374,003

(22) Filed: Sep. 28, 2023

(65) Prior Publication Data
US 2024/0025763 A1 Jan. 25, 2024

Related U.S. Application Data

(63) Continuation of application No. PCT/CN2021/142502, filed on Dec. 29, 2021.

(30) Foreign Application Priority Data

Apr. 1, 2021 (CN) .................. 202110354586.1

(51) Int. Cl.
C01G 53/50 (2025.01)
H01M 4/505 (2010.01)

(52) U.S. Cl.
CPC ............ *C01G 53/50* (2013.01); *H01M 4/505* (2013.01); *C01P 2004/03* (2013.01); *C01P 2004/61* (2013.01); *C01P 2006/90* (2013.01)

(58) Field of Classification Search
CPC ...... H01M 4/525; H01M 4/505; C01G 51/05; C01G 51/06; C01G 51/84; C01G 53/58;
(Continued)

(56) References Cited

U.S. PATENT DOCUMENTS

2023/0035993 A1* 2/2023 Xu .................. C01G 53/82

FOREIGN PATENT DOCUMENTS

CN 106745335 A * 5/2017 ............ C01G 53/82
CN 109422297 A 3/2019
(Continued)

OTHER PUBLICATIONS

Translation of CN109422297A (Year: 2019).*
(Continued)

*Primary Examiner* — Tri V Nguyen
(74) *Attorney, Agent, or Firm* — Westbridge IP LLC

(57) ABSTRACT

The present disclosure discloses a preparation method of a Ni-Rich ternary precursor and use thereof. The preparation method includes the following steps: under specified conditions, feeding an alkali liquor and a metal salt solution simultaneously for a precipitation reaction to obtain particles with D50 of 7.0 μm to 15.0 μm; continuously feeding a seed crystal, and after D10 of the particles is adjusted to 2.0 μm to 7.0 μm, stopping feeding the seed crystal; continuously feeding the alkali liquor and the metal salt solution, and collecting an overflow material; and when a particle size grows to D50 of 7.0 μm to 15.0 μm once again, repeating the
(Continued)

above operation of adding a seed crystal, and continuously collecting an overflow material; and washing, drying, and sieving the collected materials to obtain the Ni-Rich ternary precursor.

5 Claims, 2 Drawing Sheets

(58) Field of Classification Search
CPC .......... C01G 53/50; C01G 53/82; C01G 3/00; C01P 2004/51; C01P 2004/61
USPC ...................................................... 252/521.2
See application file for complete search history.

(56) References Cited

FOREIGN PATENT DOCUMENTS

| | | | | | |
|---|---|---|---|---|---|
| CN | 111883767 A | * | 11/2020 | ............. | C01G 53/82 |
| CN | 112151790 A | * | 12/2020 | ........ | H01M 10/0525 |
| WO | WO-2021134153 A1 | * | 7/2021 | ............. | C01G 45/10 |

OTHER PUBLICATIONS

Translation of CN111883767 (Year: 2020).*
Translation of CN112151790 (Year: 2020).*
Translation of CN-106745335-A (Year: 2017).*
International Search Report of PCT Patent Application No. PCT/CN2021/142502 issued on Mar. 17, 2022.

* cited by examiner

PREPARATION METHOD OF NI-RICH TERNARY PRECURSOR AND USE THEREOF

CROSS-REFERENCE TO RELATED APPLICATIONS

The present application is a continuation application of PCT application No. PCT/CN2021/142502 filed on Dec. 29, 2021, which claims the benefit of Chinese Patent Application No. 202110354586.1 filed on Apr. 1, 2021. The contents of all of the aforementioned applications are incorporated by reference herein in their entirety.

TECHNICAL FIELD

The present disclosure belongs to the technical field of lithium-ion battery (LIB) cathode materials, and specifically relates to a preparation method of a Ni-Rich ternary precursor and use thereof.

BACKGROUND

In recent years, with the popularization of new energy electric vehicles, there are higher and higher requirements for a cruising range of electric vehicles. The key to increasing a cruising range is to increase an energy density of a power battery carried by an automobile. At the moment when there is no significant breakthrough for the battery system, increasing a battery capacity per unit volume is the focus of current research and the direction of development. Based on this, there are higher and higher requirements for a compacted density (CD) of a battery cathode active material, and a CD of the cathode material is directly related to a CD of a precursor. Therefore, the precursor needs to have a high CD, and particles in the precursor must have high structural strength when needing to withstand a high pressure, thereby preventing the particles from being crushed and losing activity. In addition, Ni-Rich cathode materials are more prone to rupture and degradation during rolling and cycling processes compared to traditional materials. Studies have shown that the material particle fracture due to physical and chemical reactions is also related to a physical strength of a precursor, and thus improving the physical anti-cracking performance of the precursor can also help to improve the fracture problem of such materials.

Previously, a CD of a precursor was not attracted much attention in the industry and was also not used as a quality index for product supply. At present, in order to meet the high capacity target, higher and higher requirements are placed on the CD and anti-cracking performance of a Ni-Rich precursor while using a Ni-Rich ternary material. Products produced by traditional methods can no longer meet the requirements of Ni-Rich precursors in this aspect.

A single ternary precursor particle can be regarded as a secondary spherical polycrystalline particle formed by stacking multiple primary crystal grains. A direct contact surface between the primary crystal grains forms a grain boundary, and a non-contact area forms a pore. When an increasing pressure is applied to a precursor particle, a stress increases after the particle is compressed, and the stress is continuously concentrated at a lattice defect in a crystal grain; when a stress limit is reached, a dislocation is formed; and when the pressure is continuously applied, the dislocation slips in the crystal grain, causing the dislocation to propagate and grow to form a slip band. A grain boundary is one of the biggest obstacles to the movement of a dislocation, and thus a slip band of a crystal grain cannot travel across a grain boundary to an adjacent crystal grain. To transfer a dislocation to an adjacent crystal grain, a dislocation source in an adjacent crystal grain must be initiated to generate a new slip band. The propagation of a slip band among crystal grains eventually makes the polycrystalline particle broken down. It can be seen that increasing the number of grain boundaries is an important means to improve the anti-cracking performance of a material. Moreover, proper pores inside material particles will provide a given buffer space for the particles to undergo elastic deformation under a pressure. However, when the pressure continues to increase and exceeds a yield limit, the material undergoes plastic deformation until a dislocation occurs, which will also cause the particles to be broken down. It can be seen that a proper porosity can provide a given buffer effect when a particle is under a pressure, but not the more the better. On the one hand, as pores increase, a weight of a particle will decrease, which will directly reduce a CD of a material. On the other hand, an internal volume of a particle is limited, and when pores increase, the number of grain boundaries will decrease accordingly, which makes the particle more likely to be broken down.

For multiple secondary polycrystalline particles, a particle size distribution thereof is not as concentrated as possible, because uniform particles are difficult to form a densely-stacking form and the particles will have large pores. On the one hand, a macroscopic volume of a powder will be increased, which is not conducive to the improvement of a CD. On the other hand, after a powder is compressed, there are few contact points among particles, which easily results in stress concentration and is not conducive to the improvement of the compression resistance of particles.

SUMMARY

The present disclosure is intended to solve at least one of the technical problems existing in the prior art. In view of this, the present disclosure provides a preparation method of a Ni-Rich ternary precursor and use thereof, which can meet the requirements of a Ni-Rich precursor for a CD and also increases the anti-cracking performance of precursor particles.

According to one aspect of the present disclosure, a preparation method of a Ni-Rich ternary precursor is provided, including the following steps:

S1: preparing a nickel salt, a cobalt salt, and a manganese salt into a metal salt solution;

S2: in an inert atmosphere, heating and feeding ammonia water, feeding an alkali liquor to adjust a pH, and feeding the alkali liquor and the metal salt solution simultaneously for a precipitation reaction to obtain particles with D50 of 7.0 μm to 15.0 μm;

S3: continuously feeding a seed crystal, and after D10 of the particles is adjusted to 2.0 μm to 7.0 μm, stopping feeding the seed crystal; continuously feeding the alkali liquor and the metal salt solution, and collecting an overflow material; and when a particle size grows to D50 of 7.0 μm to 15.0 μm once again, repeating the above operation of adding a seed crystal, and continuously collecting an overflow material;

S4: washing, drying, and sieving the collected materials to obtain the Ni-Rich ternary precursor.

In some preferred implementations of the present disclosure, in S2, the particles obtained may have a particle size D50 of 8.0 μm to 12.0 μm; in S3, the seed crystal may be fed to adjust D10 of the particles to 2.0 μm to 5.0 μm; and in S3, when the particle size grows to D50 of 8.0 µm to 12.0 µm once again, the above operation of adding a seed crystal may be repeated.

In some implementations of the present disclosure, the preparation method may further include a preparation process of the seed crystal: adding water to a seed crystal reactor, introducing an inert gas, and starting stirring and heating; feeding ammonia water, feeding an alkali liquor to adjust a pH, and feeding the alkali liquor and the metal salt solution simultaneously for a precipitation reaction; and continuing the feeding, and after a particle size grows to 2 µm to 7 µm and preferably 2 µm to 5 µm, stopping the feeding to obtain the seed crystal, during which a supernatant in the seed crystal reactor is filtered out to maintain a constant liquid level, a material is continuously concentrated, and particles continue to grow.

In some implementations of the present disclosure, during the preparation process of the seed crystal, the stirring may be conducted at a speed of 150 rpm to 300 rpm; the heating may be conducted at 50° C. to 80° C.; the ammonia water in the seed crystal reactor may have a concentration of 0 g/L to 10 g/L; and the pH may be adjusted to 11.0 to 13.0.

In some implementations of the present disclosure, in S2, after the pH is adjusted, the seed crystal may be first added, and then the alkali liquor and the metal salt solution may be simultaneously fed for a precipitation reaction; and the seed crystal may have a particle size of 2 µm to 7 µm. The precursor may be prepared by seed crystal growth.

In some implementations of the present disclosure, in S1, the Ni-Rich ternary precursor may have a general structural formula of $Ni_xCo_yMn_{1-x-y}(OH)_2$, where $0.6<x<1$, $0<y<0.4$, and $x+y<1$.

In some implementations of the present disclosure, in S4, the Ni-Rich ternary precursor may have a particle size D10 of 2.0 µm to 7.0 µm, a particle size D50 of 7.0 µm to 15.0 µm, and a particle size D90 of 12.0 µm to 20.0 µm.

In some preferred implementations of the present disclosure, the Ni-Rich ternary precursor may have a particle size D10 of 2.0 µm to 5.0 µm, a particle size D50 of 8.0 µm to 12.0 µm, and a particle size D90 of 18.0 µm to 20.0 µm.

In some implementations of the present disclosure, in S2, continuous stirring may be conducted during a whole process of the precipitation reaction at a speed of 150 rpm to 250 rpm.

In some implementations of the present disclosure, in S2, the stirring may be conducted at a speed of 150 rpm to 250 rpm.

In some implementations of the present disclosure, in S2, the heating may be conducted at 50° C. to 80° C.

In some implementations of the present disclosure, in S2, the ammonia water may have a concentration of 0 g/L to 10 g/L.

In some implementations of the present disclosure, in S2, the pH may be adjusted to 11.0 to 13.0.

The present disclosure also provides use of the preparation method described above in the preparation of LIBs.

According to a preferred implementation of the present disclosure, the present disclosure at least has the following beneficial effects:

1. The present disclosure adopts a seed crystal to adjust a particle size, such that the particle size is kept in a proper wide distribution, which improves a bulk density of a precursor and enhances the anti-cracking performance. Moreover, a seed crystal with uniform particle size also avoids the generation of a micropowder due to particle size adjustment in the traditional continuous production process.

2. The present disclosure adopts a batch-continuous production process of batch seed crystal feeding and continuous discharging to ensure a highly-constant growth environment for particles in a production process and reduce defects inside crystal grains caused by environmental fluctuations.

3. The present disclosure uses a pH range higher than the conventional one to refine primary crystal grains of a precursor, which increases the number of grain boundaries and improves the anti-cracking performance of precursor particles.

4. The present disclosure adopts high-speed stirring to make less pores produced inside particles and increase a density of particles. Moreover, the high-speed stirring improves the sphericity of particles, and a high sphericity also helps to increase a contact area among particles under pressure and reduce stress concentration.

BRIEF DESCRIPTION OF THE DRAWINGS

The present disclosure is further described below with reference to accompanying drawings and examples.

DETAILED DESCRIPTION

Figure 1:
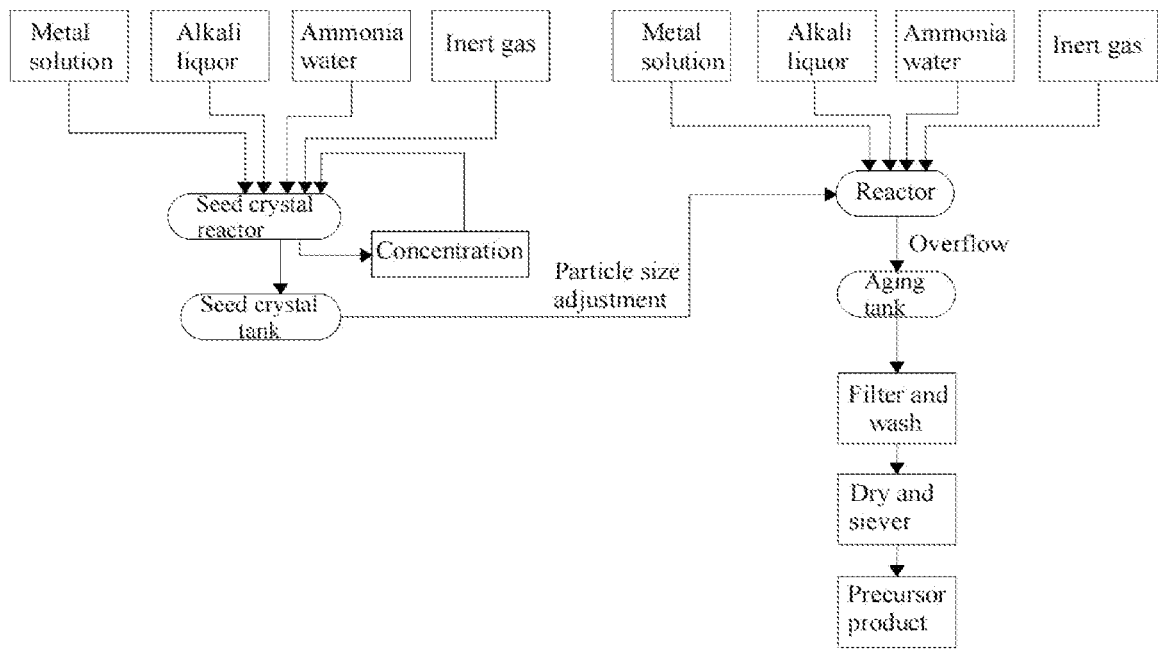
FIG. 1 is a flowchart of the process according to the present disclosure.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, a Ni-Rich ternary precursor was prepared, and a specific preparation process was as follows:

S1: According to a metal molar ratio of 0.82:0.12:0.06, nickel sulfate, cobalt sulfate, and manganese sulfate were prepared into a 1.6 mol/L metal salt solution for later use.

S2: Preparation of a seed crystal: Pure water was added to a seed crystal reactor, nitrogen was introduced, and stirring and heating were started at a speed of 220 rpm and a temperature of 65° C.; ammonia water was fed to enable an ammonia concentration of 7.0 g/L in the reactor, an alkali liquor was fed to adjust a pH to 11.6, and the alkali liquor and the metal salt solution were fed simultaneously for a precipitation reaction, where an environment in the reactor was kept constant during the feeding and a supernatant in the reactor was filtered out through a microporous filtration device to make a liquid level in the reactor highly constant; the feeding continued until a particle size grew to 3.0 µm to obtain the seed crystal, where a material in the reactor was continuously concentrated and the particles continuously grew; and the prepared precursor seed crystal was added into a seed crystal tank for later use.

S3: Precursor growth (adding a seed crystal for growth): Pure water was added to a reactor at a volume two thirds of a volume of the reactor, nitrogen was introduced, and stirring and heating were started at a speed of 180 rpm and a temperature of 65° C.; ammonia water was fed to make an ammonia concentration in the reactor reach 6.0 g/L, and then the alkali liquor was fed to adjust a pH in the reactor to 11.5; the seed crystal was fed into the reactor at a volume one third of the volume of the reactor, and then the alkali liquor and the metal salt solution were fed simultaneously, where the precipitation reaction of metal ions on the seed crystal made the seed crystal particles grow; the feeding continued, during which a pH in the reactor, an ammonia concentration, a stirring speed, and a temperature in the reactor were kept constant; and after filling the reactor, the material flowed out through an overflow port, where the overflow material was discarded as an unqualified product and particles in the reactor continued to grow.

S4: Particle size adjustment and material collection: When particles in the reactor grew to a particle size D50 of 10.5 µm, the feeding of the seed crystal was started; after the particle size of the material in the reactor decreased to D10 of 4.0, the feeding of the seed crystal was stopped; because the alkali liquor and the metal salt solution were continuously fed, the seed crystal and the previous particles continued to grow, and overflow materials were collected in an aging tank; when a particle size D50 of particles in the reactor grew to 10.5 µm once again, the seed crystal was fed once again to reduce the particle size; the above operation was repeated constantly, and overflow materials were continuously collected, washed, dried, and sieved to obtain the final Ni-Rich ternary precursor product $Ni_{0.82}Co_{0.12}Mn_{0.06}(OH)_2$. A particle size of particles in the reactor was kept in a dynamic balance through batch seed crystal feeding, and the particle size was always kept within a target range. The particle size D50 was kept at about 10.0 µm in this example.

Example 2

In this example, a Ni-Rich ternary precursor was prepared, and a specific preparation process was as follows:

S1: According to a metal molar ratio of 0.90:0.07:0.03, nickel sulfate, cobalt sulfate, and manganese sulfate were prepared into a 1.8 mol/L metal salt solution for later use.

S2: Preparation of a seed crystal: Pure water was added to a seed crystal reactor, nitrogen was introduced, and stirring and heating were started at a speed of 240 rpm and a temperature of 70° C.; ammonia water was fed to enable an ammonia concentration of 5.0 g/L in the reactor, an alkali liquor was fed to adjust a pH to 12.0, and the alkali liquor and the metal salt solution were fed simultaneously for a precipitation reaction, where an environment in the reactor was kept constant during the feeding and a supernatant in the reactor was filtered out through a microporous filtration device to make a liquid level in the reactor highly constant; the feeding continued until a particle size grew to 4.0 µm to obtain the seed crystal, where a material in the reactor was continuously concentrated and the particles continuously grew; and the prepared precursor seed crystal was added into a seed crystal tank for later use.

S3: Precursor growth (direct growth): Pure water was added to a reactor at a volume two thirds of a volume of the reactor, nitrogen was introduced, and stirring and heating were started at a speed of 220 rpm and a temperature of 70° C.; ammonia water was fed to make an ammonia concentration in the reactor reach 5.0 g/L, and then the alkali liquor was fed to adjust a pH in the reactor to 12.2; then the alkali liquor and the metal salt solution were fed simultaneously for a precipitation reaction; the feeding continued, during which a pH in the reactor, an ammonia concentration, a stirring speed, and a temperature in the reactor were kept constant; and after filling the reactor, the material flowed out through an overflow port, where the overflow material was discarded as an unqualified product and particles in the reactor continued to grow.

S4: Particle size adjustment and material collection: When particles in the reactor grew to a particle size D50 of 10.0 µm, the feeding of the seed crystal was started; after the particle size of the material in the reactor decreased to D10 of 4.0, the feeding of the seed crystal was stopped; because the alkali liquor and the metal salt solution were continuously fed, the seed crystal and the previous particles continued to grow, and overflow materials were collected in an aging tank; when a particle size D50 of particles in the reactor grew to 10.0 µm once again, the seed crystal was fed once again to reduce the particle size; the above operation was repeated constantly, and overflow materials were continuously collected, washed, dried, and sieved to obtain the final Ni-Rich ternary precursor product $Ni_{0.90}Co_{0.07}Mn_{0.03}(OH)_2$. A particle size of particles in the reactor was kept in a dynamic balance through batch seed crystal feeding, and the particle size was always kept within a target range. The particle size D50 was kept at about 9.8 µm in this example.

Comparative Example 1

In this comparative example, a Ni-Rich ternary precursor was prepared, which was different from Example 2 in that no seed crystal was added to adjust the particle size. A specific preparation process was as follows:

S1: According to a metal molar ratio of 0.90:0.07:0.03, nickel sulfate, cobalt sulfate, and manganese sulfate were prepared into a 1.8 mol/L metal salt solution for later use.

S2: Pure water was added to a reactor at a volume two thirds of a volume of the reactor, nitrogen was introduced, and stirring and heating were started at a speed of 220 rpm and a temperature of 70° C.; ammonia water was fed to make an ammonia concentration in the reactor reach 5.0 g/L, and then the alkali liquor was fed to adjust a pH in the reactor to 12.2; then the alkali liquor and the metal salt solution were fed simultaneously for a precipitation reaction; the feeding continued, during which a pH in the reactor, an ammonia concentration, a stirring speed, and a temperature in the reactor were kept constant; and after filling the reactor, the material flowed out through an overflow port, where the overflow material was discarded as an unqualified product and particles in the reactor continued to grow.

S3: When a particle size of particles in the reactor grew to D50 of 10.0 µm, a pH or a stirring speed was increased to produce small particles from the material in the reactor to reduce the particle size, which controlled D50 at about 10.0 µm; and the material inside the reactor overflowed into an aging tank, and then was washed, dried, and sieved to obtain the final Ni-Rich ternary precursor product $Ni_{0.90}Co_{0.07}Mn_{0.03}(OH)_2$.

Comparative Example 2

This comparative example was the commercial 811 precursor produced by Guangdong Brunp recycling Technology Co., Ltd.

Test Example

In this test example, the particle size, tap density (TD), and CD were tested for the precursors of Examples 1 and 2 and Comparative Examples 1 and 2, and results were shown in Table 1 below.

TABLE 1

| Sample | D10 (μm) | D50 (μm) | D90 (μm) | TD (g/cm³) | CD (g/cm³) |
|---|---|---|---|---|---|
| Example 1 | 4.35 | 10.05 | 18.57 | 2.12 | 3.46 |
| Example 2 | 4.23 | 9.86 | 19.02 | 2.15 | 3.49 |
| Comparative Example 1 | 6.33 | 10.10 | 16.52 | 1.98 | 3.12 |
| Comparative Example 2 | 5.85 | 10.28 | 16.02 | 2.07 | 3.18 |

According to the data in Table 1, an average particle size D50 of Examples 1 and 2 and Comparative Examples 1 and 2 is about 10 μm; the D10 of each of Examples 1 and 2 is smaller than that of Comparative Examples 1 to 2, and D90 is larger than that of Comparative Examples 1 to 2; and particle size distributions of the examples are wider that of the comparative examples. The TD and CD of the example both are significantly greater than those of the comparative example, indicating that the particle size distribution and particle strength of the precursor of the example of the present disclosure can significantly improve the TD and CD of particles.

FIG. 1 is a flowchart of the process of the present disclosure, where a precursor seed crystal is prepared in a seed crystal reactor and then added into a seed crystal tank for later use; the precursor seed crystal is mainly used to adjust a particle size of a precursor in a reactor; the precursor grows in the reactor and a particle size thereof is adjusted through the seed crystal; and after a target particle size is reached, an overflow material is collected into an aging tank, then filtered, washed, dried, and sieved to obtain the final precursor product.

Figure 2:
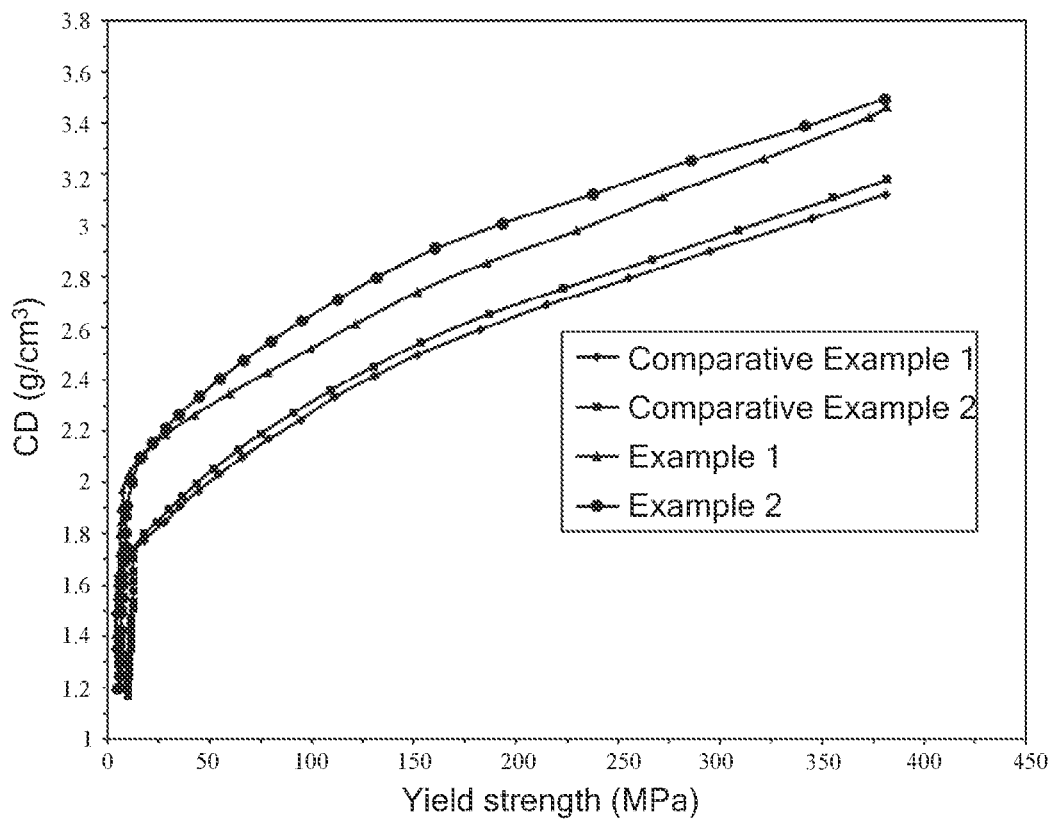
FIG. 2 is a graph illustrating the CD of the precursors in Examples 1 and 2 and Comparative Examples 1 and 2.

FIG. 2 is a graph illustrating the CD of the precursors in Examples 1 and 2 and comparative examples. In order to verify the anti-cracking performance of the materials, the precursors were subjected to a pressure cracking test on a CD measuring machine, with a maximum yield strength set to 380 MPa. It can be seen from FIG. 2 that, under the same pressure, the precursors obtained in Examples 1 and 2 have higher CD than the conventional precursor sample, indicating that the precursor particles of Examples 1 and 2 have higher bulk density and better pressure resistance. The compaction transition points of Examples 1 and 2 are at 18.04 MPa and 16.08 MPa, which are far higher than the compaction transition point of the comparative example (13.20 MPa), indicating that the anti-pressure cracking performance of Examples 1 and 2 is much higher than that of the precursor of the comparative example.

Figure 3:
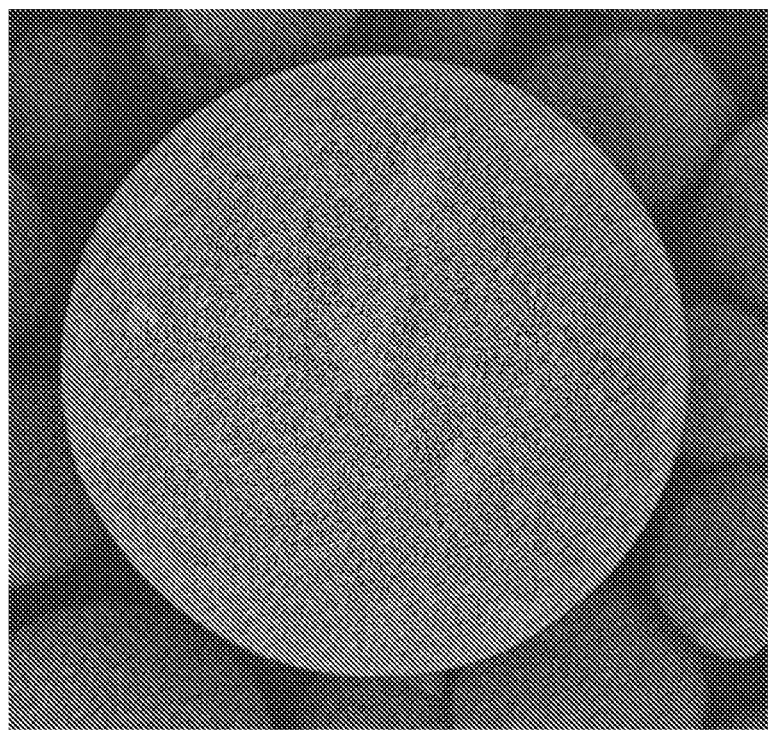
FIG. 3 is scanning electron microscopy (SEM) image of the precursor in Example 1.

FIG. 3 is an SEM image of the precursor of Example 1, and it can be seen from the figure that the precursor particles are regular spherical particles, and platy crystals are evenly and densely distributed on a surface of the particles.

Figure 4:
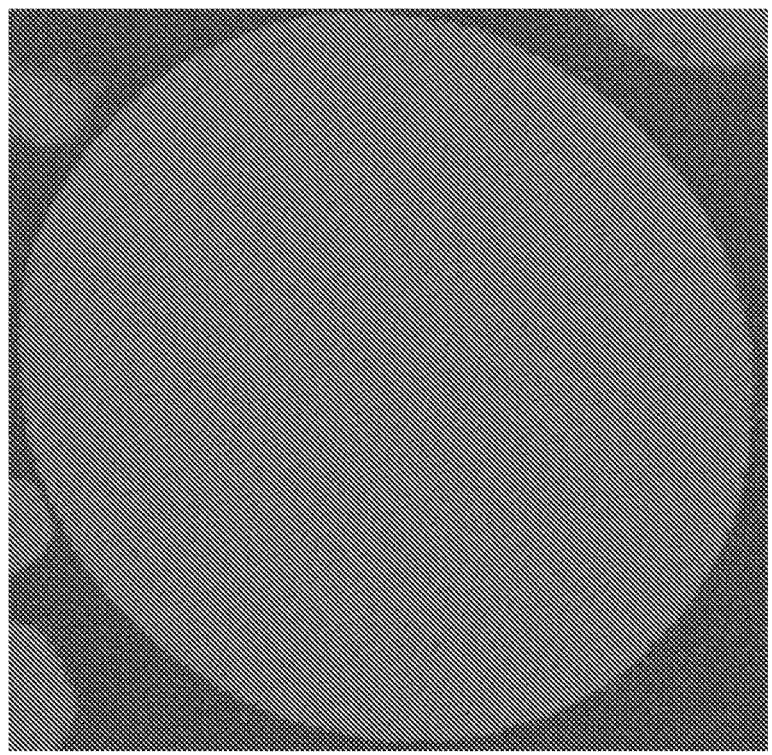
FIG. 4 is an SEM image of a cross section of the precursor in Example 1.

FIG. 4 is an SEM image of a cross section of the precursor in Example 1, and it can be seen from the figure that the inside of the particle is composed of fine primary crystal grains, with many and evenly-distributed grain boundaries and appropriate pores. This internal structure with many grain boundaries and appropriate pores and the wide particle size distribution is the main reason for the prominent anti-cracking performance.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A preparation method of a Ni-Rich ternary precursor, comprising the following steps:
    S1: preparing a nickel salt, a cobalt salt, and a manganese salt into a metal salt solution;
    S2: in an inert atmosphere, heating and feeding ammonia water, feeding an alkali liquor to adjust a pH, and feeding the alkali liquor and the metal salt solution simultaneously for a precipitation reaction to obtain particles with $D_{50}$ of 7.0 μm to 15.0 μm;
    S3: continuously feeding a seed crystal, and after $D_{10}$ of the particles is adjusted to 2.0 μm to 7.0 μm, stopping feeding the seed crystal; continuously feeding the alkali liquor and the metal salt solution, and collecting an overflow material; and when a particle size grows to $D_{50}$ of 7.0 μm to 15.0 μm once again, repeating an operation of feeding the seed crystal, and continuously collecting an overflow material; and
    S4: washing, drying, and sieving all of the overflow materials collected in step S3 to obtain the Ni-Rich ternary precursor;
    in S2, the pH is adjusted to 11.0 to 13.0, after the pH is adjusted, the seed crystal is first added, and then the alkali liquor and the metal salt solution are simultaneously fed for the precipitation reaction; and the seed crystal has a particle size of 2.0 μm to 7.0 μm;
    in S4, the Ni-Rich ternary precursor has a particle size $D_{10}$ of 2.0 μm to 5.0 μm, a particle size $D_{50}$ of 7.0 μm to 15.0 μm, and a particle size $D_{90}$ of 12.0 μm to 20.0 μm; and the Ni-Rich ternary precursor has a tap density of 2.12 g/cm³ to 2.15 g/cm³.

2. The preparation method according to claim 1, further comprising a preparation process of the seed crystal: adding water to a seed crystal reactor, introducing an inert gas, and starting stirring and heating; feeding ammonia water, feeding an alkali liquor to adjust a pH, and feeding the alkali liquor and the metal salt solution simultaneously for a precipitation reaction; and continuing feeding the alkali liquor and the metal salt solution, and after a particle size of the seed crystal grows to 2.0 μm to 7.0 μm, stopping feeding the alkali liquor and the metal salt solution to obtain the seed crystal.

3. The preparation method according to claim 1, wherein in S4, the Ni-Rich ternary precursor has a general structural formula of $Ni_xCo_yMn_{1-x-y}(OH)_2$, wherein $0.6<x<1$, $0<y<0.4$, and $x+y<1$.

4. The preparation method according to claim 1, wherein in S2, continuous stirring is conducted during a whole process of the precipitation reaction at a speed of 150 rpm to 250 rpm.

5. The preparation method according to claim 1, wherein in S2, the heating is conducted at 50° C. to 80° C.

* * * * *